United States Patent [19]
Boyle

[11] Patent Number: 5,392,654
[45] Date of Patent: Feb. 28, 1995

[54] ROCK BOLT LOAD SENSOR

[75] Inventor: Alan Boyle, Warrandyte, Australia

[73] Assignee: Technological Resources Pty, Ltd., Melbourne, Australia

[21] Appl. No.: 136,328

[22] Filed: Oct. 13, 1993

[51] Int. Cl.[6] .............................. F16B 31/02
[52] U.S. Cl. ........................ 73/761; 411/14
[58] Field of Search ............... 73/761, 763, 774, 779, 73/862.69, 862.626, 773, 781, 786; 33/DIG. 5; 411/10, 11, 14

[56] References Cited

U.S. PATENT DOCUMENTS

Re. 30,183  1/1980  Popenoe ................. 411/14
3,624,713  11/1971  Goldberg ............... 73/761

FOREIGN PATENT DOCUMENTS 0222280  10/1942  Switzerland ........... 73/761

Primary Examiner—Hezron E. Williams
Assistant Examiner—James M. Olsen
Attorney, Agent, or Firm—Fish & Richardson

[57] ABSTRACT

A rock bolt load sensor assembly for use to determine the load on a nut screwed onto a bolt embedded in a rock face, the assembly comprising a plurality of spring washers arranged to be mounted on the bolt between the nut and a roof plate, and a sensor comprising an induction coil adapted to be, in use, placed around the washers, the sensor including an indicator coupled to the induction coil whereby in use, the spring washers define an air space which varies in dependence on the load on the bolt and the induction coil provides an electrical indication of variation of the air space and the indicator provides an indication of variation of the load on the bolt.

11 Claims, 4 Drawing Sheets

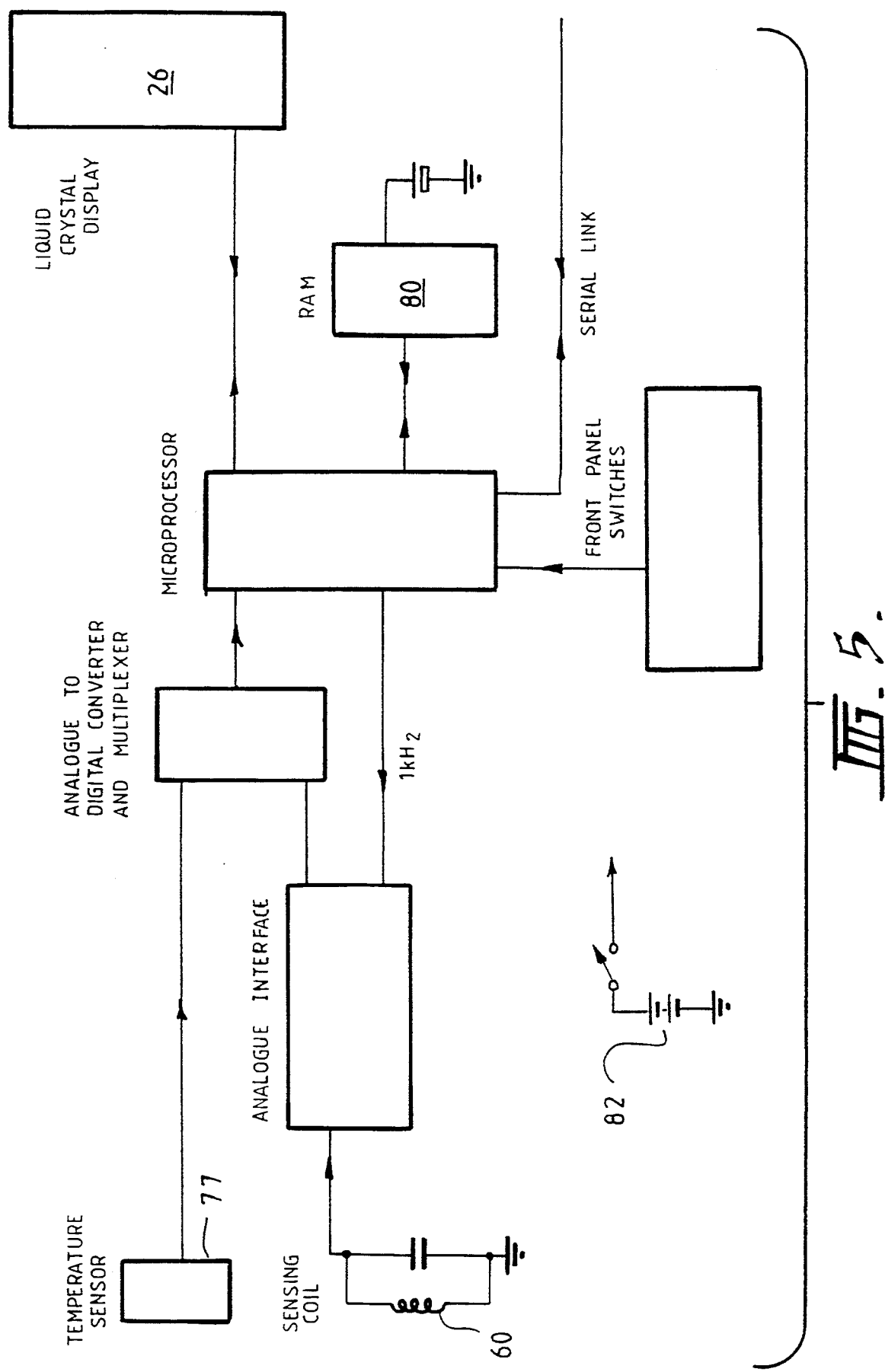

5,392,654

ROCK BOLT LOAD SENSOR

FIELD OF THE INVENTION

This invention relates to devices for measuring the load on the tensioning nut of rock bolts. In particular, the invention relates to a device that can measure the load on the tensioning nut of individual rock bolts used for roof and wall support in mining and civil engineering applications.

In the coal mining industry in Australia, rock bolts are the primary roof support means. Rock bolts are also widely used in metal and non-metal mines on a world wide basis. The rock bolts that are in common use are usually expansion, grouted and resin anchored types. The bolt extends through an aperture in a roof plate to be embedded deep into the surface of the mine roof. A nut and washer is then applied to the threaded end of the bolt and the nut is tightened to a predetermined torque to place the whole assembly in tension. Rock bolts function to reduce bed separation and rock relaxation following tunnelling. Thus, rock bolts are an important and critical component of any mine. Once the rock bolt has been anchored to the support structure, it is as described above, tensioned by monitoring the torque applied to the nut to ensure adequate loading. Once the bolt has been tensioned to the desired load, it is usual to check the loading of the bolt for relaxation caused by movement and other variation in ambient effects.

It is possible to obtain instrumented rock bolts that have built in strain gauges which provide an immediate and simple means of monitoring the strain within the bolt. The problem with these bolts is that they are very expensive and tend to be unreliable due to the delicate nature of the strain gauges and the wiring that is employed in association with the strain gauges. A more economical approach is to place a load cell between the roof or the wall surface and the tensioning nut of the anchoring bolt to monitor the compressive force that is present on the nut. Whilst the load cell does not give a complete picture of the forces acting within distributed grout or resin anchored bolts, it has been shown to provide useful information on the time dependent loading of the bolt. The problem with this solution to the problem is that load sensors are too expensive to be applied to every bolt in a mine. Thus, it is common practice to apply the load sensors to just a sample of the existing bolts which means that it is not possible to obtain a comprehensive picture of the load on the rock bolts. Rock bolts are also used in particularly severe or hostile environments and thus the electrical connections that are conventionally used on load cells frequently prove unreliable.

It is these problems that have brought about the present invention.

SUMMARY OF THE INVENTION

According to one aspect of the present invention, there is provided a rock bolt load sensor assembly for use to determine the load on a nut screwed onto a bolt embedded in a rock face, the assembly comprising a plurality of spring washers arranged to be mounted on the bolt between the nut and a roof plate, and a sensor comprising an induction coil adapted to be, in use, placed around the washers, the sensor including indicator means coupled to the induction coil whereby in use, the spring washers define an air space which varies in dependence on the load on the bolt and the induction coil provides an electrical indication of variation of the air space and the indicator means provides an indication of variation of the load on the bolt.

The term "spring washer" as used herein embraces washers in the form of spring steel discs curved in cross-section so that the degree of curvature changes under load. These washers are sometimes known as Belleville washers.

According to another aspect of the present invention, there is provided a hand-held rock bolt load sensor comprising an annular sensor head pivotally mounted adjacent one end of an elongate handle, the sensor head comprising an induction coil and location means, the induction coil being electrically coupled to indicator means whereby in use the sensor head can be positioned over a rock bolt with the location means determining the position of the coil relative to the bolt and whereby the induction coil provides an electrical signal in dependence on variation in load on the bolt which is displayed by the indicator means.

According to a further aspect of the present invention, there is provided a method of measuring and recording variations in the loads on rock bolts comprising placing spring washers between a rock plate and the nut of each rock bolt, periodically applying a hand-held rock bolt load sensor according to claim 9 over each rock bolt, and computing the reading taken by the sensor on each rock bolt.

DESCRIPTION OF THE DRAWINGS

An embodiment of the invention will now be described by way of example only with reference to the accompanying drawings in which:

FIG. 3 is a tuning circuit for use with the sensor, FIG. 5 is a circuit illustrating a microprocessor based display system.

DESCRIPTION OF THE PREFERRED EMBODIMENTS

Figure 1:
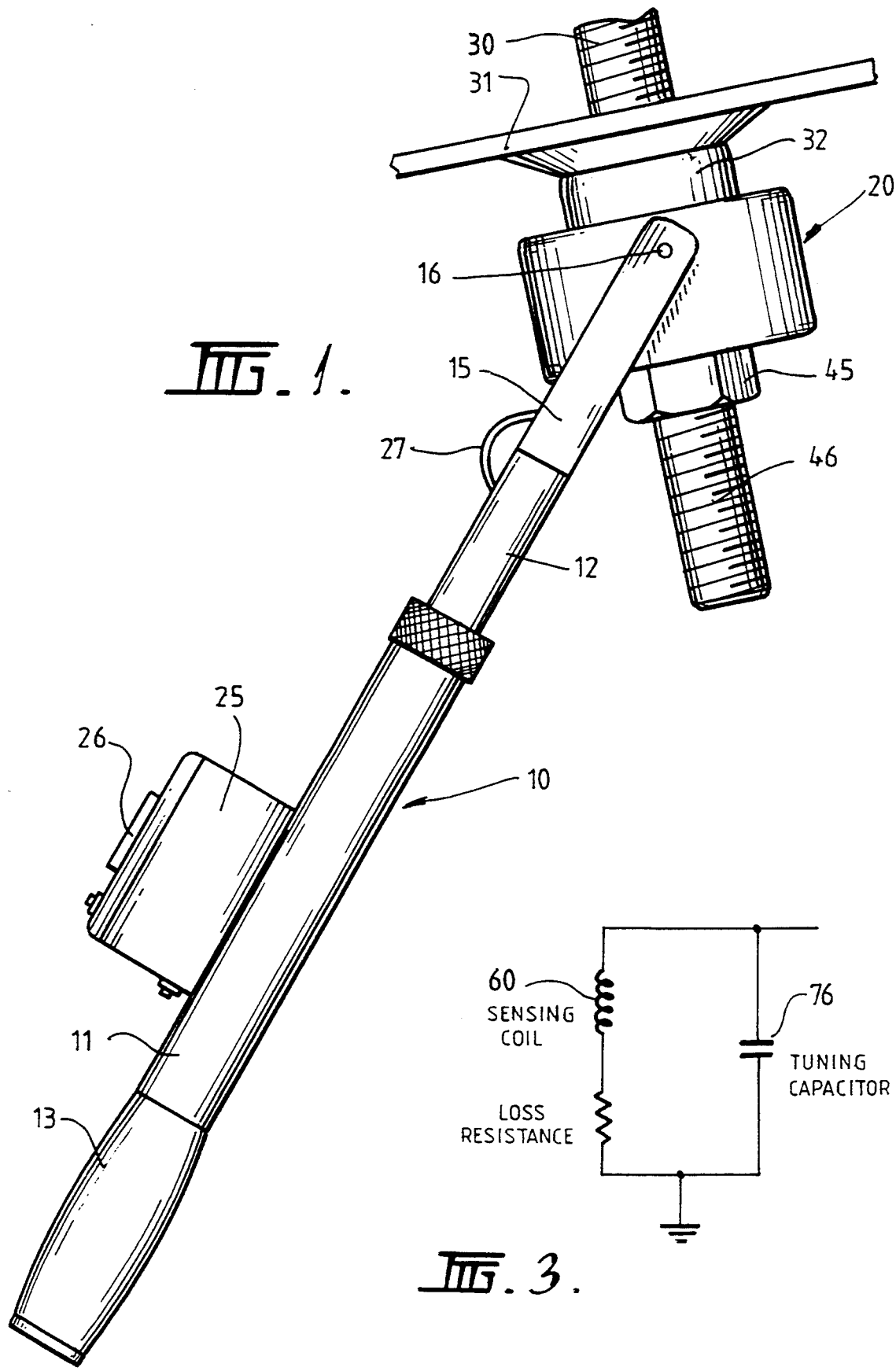
FIG. 1 is a side on view of a rock bolt load sensor attached to an extension arm.
Figure 2:
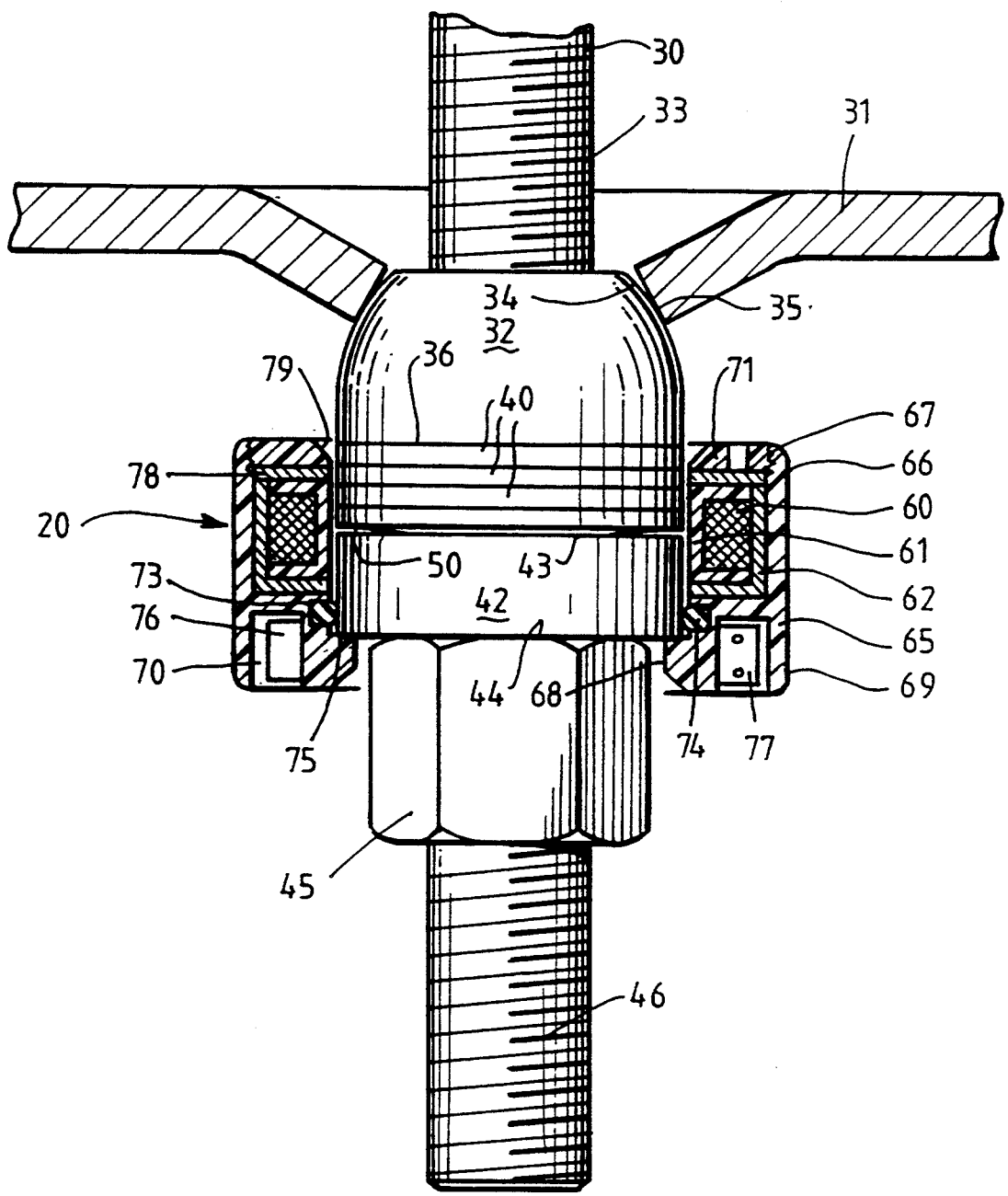
FIG. 2 is a cross-sectional view taken through the rock bolt showing the rock bolt load sensor in position on the bolt.

The rock bolt load sensor assembly as shown in FIGS. 1 and 2 comprises a sensor head 20 pivotally attached to one end of an extension arm 10 formed in two pieces 11 and 12 that telescope one within the other. The lower piece 11 is formed with a hand grip 13 and the upper piece 12 terminates in a forked end 15 which pivotally supports the sensor head 20 about a pivot axis 16. As shown in FIG. 1, the pivotal support of the head 20 allows the inclination of the sensor head relative to the extension arm 10 to be varied. In the embodiment shown in FIG. 1, the lower portion 11 of the extension arm 10 supports a microprocessor display unit 25 which includes an LCD display 26. The display unit 25 is electrically coupled to the sensor head 20 by a cable 27 that runs up the lower part of the extension arm.

The sensor head 20 and roof bolt 30 are shown in detail in FIG. 2 which is a cross-sectional view taken through a roof bolt. The roof bolt 30 extends into the mine face through a roof plate 31. A hemispherical steel spacer 32 is located on the shank 33 of the bolt 30 with its curved end 34 in engagement with a dished recess 35 in the roof plate 31. A stack of spring washers 40 usually numbering 2 to 8 is positioned over the shank 33 of the bolt 30 against the planar surface 36 of the hemispherical spacer 32. A cylindrical steel spacer element 42 with planar surfaces 43 and 44 is then positioned in direct contact with the stack 40 of spring washers. A nut 45 is then screwed onto the threaded end 46 of the bolt 30 and is tightened to a predetermined torque thereby compressing the hemispherical spacer 32, the stack of washers 40 and the cylindrical spacer 42 into compressed engagement against the roof plate 31. The spring washers 40 are dished in cross-section so that the stack of washers 40 produces a predictable wedge shaped air gap 50 between the washers and the adjacent surface 43 of the cylindrical spacer 42. The wedge shaped air gap 50 varies in accordance with the load on the bolt 30.

The sensor comprises an induction coil 60 that is wound onto a hollow annular plastics former 61. The coil and former is located in a mild steel annular sleeve 62 of L-shaped cross-section as shown in FIG. 2. The sleeve 62 is a press fit within the interior of an annular plastics housing 65. The housing is of cylindrical profile with a central throughway 68 and terminates at one end 66 in an internal screw thread 67. The opposite end 69 has an annular recess 70 formed therein. The recess 70 accommodates electrical circuitry including a capacitor 76 and temperature sensor 77. The end 69 of the housing also terminates in an inwardly extending shoulder 75 that in use abuts against the surface 44 of the spacer element 42. The interior of the plastics housing 65 is also provided with an annular groove 73 into which an O-ring 74 is seated to provide a Seal against the periphery of the spacer element 42. The induction coil 60 and sleeve 62 are located within the interior of the plastics housing and a flat mild steel washer 78 is positioned over the end of the coil assembly so that that whole coil is sheathed on its exterior by mild steel. The use of the mild steel sheath reduces the magnetic path length. An externally threaded plastics cover plate 71 Screws into the internal threaded end 67 of the housing assembly and is locked in position by a locking grub screw (not shown) to seal the unit. The cover plate 71 has a central aperture 79 with a tapered lead in. As shown in FIG. 2, the sensor is designed to be a close clearance fit on the extremity of the bolt assembly.

As the sensor head 20 is positioned co-axially over the nut 45 of the rock bolt 30, it is moved vertically up to a position where the shoulder 75 abuts the underside 44 of the cylindrical spacer 42 to accurately position the sensor coil 60 relative to the stack of spring washers 40 to ensure that the induction coil 60 is in close proximity to the wedge shaped air gap 50. The wedge shaped air gap 50 varies with the compressive load between the rock bolt nut 45 and the roof plate 31 and thus the induction coil can sense any change in air gap.

The coil 60 is tuned by the capacitor 76 and a temperature sensor 77 also controls the circuit to accommodate fluctuations in temperature. The sensor uses a resonant circuit tuned to about 1 KHz. This frequency is chosen to ensure that the inductance changes in the coil 60 are a result of change in the magnetic core comprising the spring washers 40 and air gap 50. If the frequency is too high, there is a danger of inductance change due to the surface conductivity of the washers and not the magnetic property as required. If the frequency is too low, the sensing coil 60 becomes vulnerable to electrical noise components, mostly odd harmonics, of local 50 Hz mains wiring. FIG. 3 is an illustration of part of a circuit for tuning the sensing coil 60.

The temperature sensor includes an integrated circuit which is incorporated into the sensor circuit to compensate for drift in the tuned circuit resonant frequency due to coil expansion caused by heat. It also compensates for capacitance variations caused by temperature fluctuations.

Figure 4:
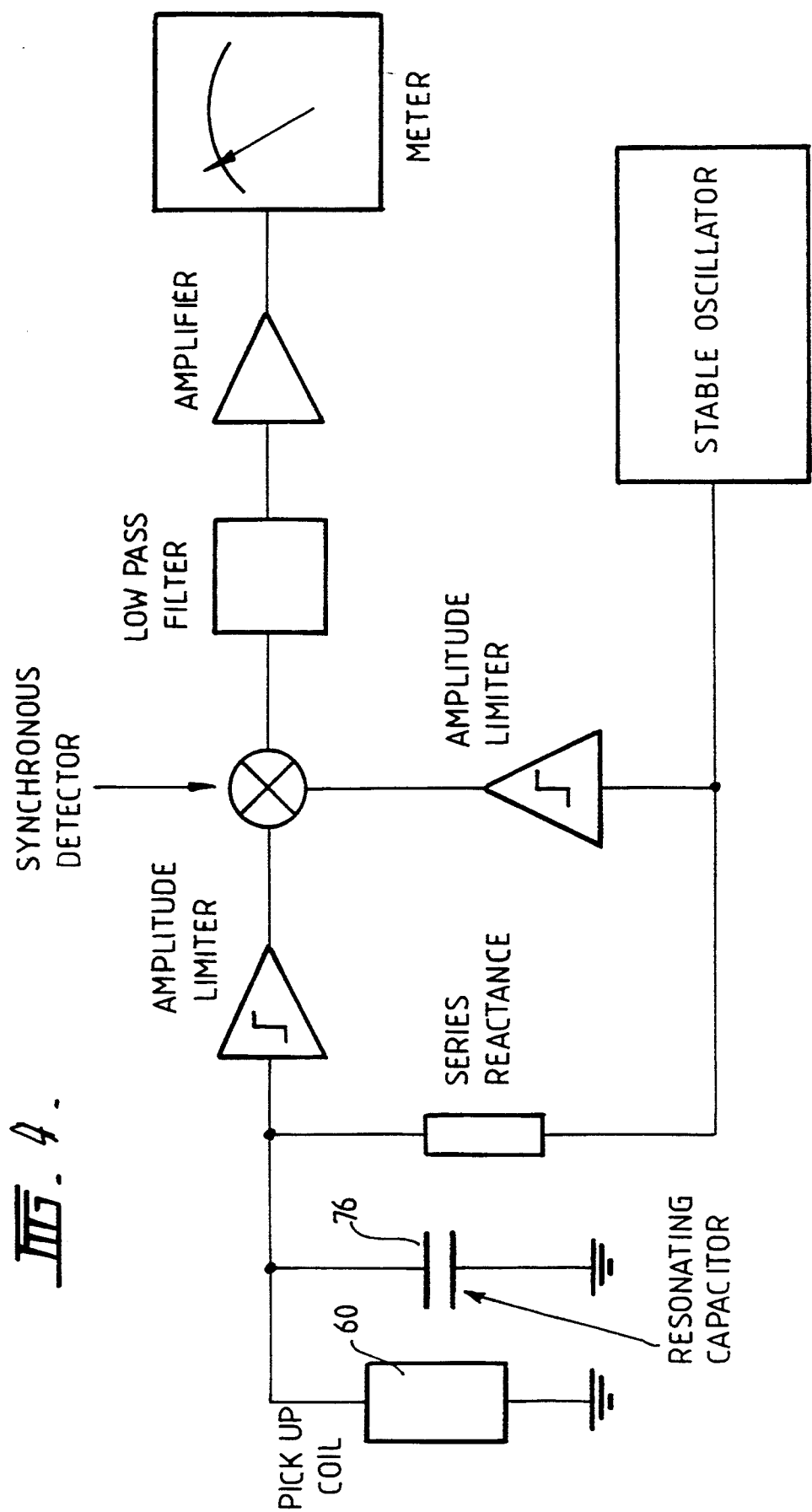
FIG. 4 is a basic block diagram of an analog processing system for use with the sensor.

FIG. 4 is a basic block diagram of the analogue processing system that is used to extract the desired signal from the sensing coil.

In FIG. 5, a microprocessor based display system is incorporated in the assembly. This has the features of a battery RAM 80 to allow an identification and measurement quantity to be stored for each rock bolt, ability to download stored information to either a printer or a computer via a serial link, a calibration route to eliminate long term drift in the sensing and processing system, ability to handle sensors with different force ranges, ability to provide temperature compensation for the sensing probe and a display of error messages. The complete electronic processing and display system is powered using four 1.22 volt rechargeable Nickel Cadmium batteries 82. Circuit components and current levels are designed to meet the intrinsic safety requirements of coal mines.

The sensor assembly described above provides a sophisticated and accurate means of determining the load on mining roof bolts. The hand held unit carries its own circuitry with a visual indicator of the measured load. In a more sophisticated format, the assembly is designed to be coupled to a microprocessor which can store the information and provide a printout of the measured load at each bolt. The assembly has the advantage that it is a simple operation to place the sensor in close proximity to the stack of spring washers 40 on each bolt. There is no direct wiring to the bolt and thus, the assembly can withstand the hostile environment in which it is used. The sensor head and circuitry may be protected by covering the assembly in a suitable exterior plastics wrapping. Tape may also be used to hold the components together. The assembly has the further advantage that a single unit can be used to measure the load on all the rock bolts. Thus, considerably simpler and cheaper rock bolts can be utilised and the whole assembly has the sturdiness to provide reliable use over a long period.

Having now described my invention what I claim is:

1. A rock bolt load sensor assembly for use to determine the load on a nut screwed onto a bolt embedded in a rock face, the assembly comprising a plurality of spring washers arranged to be mounted on the bolt between the nut and a roof plate, and a sensor comprising an induction coil adapted to be, in use, placed around the washers, the sensor including indicator means coupled to the induction coil whereby in use, the spring washers define an air space which varies in dependence on the load on the bolt and the induction coil provides an electrical indication of variation of the air space and the indicator means provides an indication of variation of the load on the bolt.

2. The assembly according to claim 1 wherein the induction coil is mounted in a hollow housing Whereby the housing in use, may be positioned over the bolt with the induction coil adjacent the spring washers.

3. The assembly according to claim 2 wherein the housing includes location means that limits movement of the housing over the bolt to ensure the induction coil is adjacent the spring washers.

4. The assembly according to claim 2 wherein the housing is pivotally mounted to an elongate handle.

5. The assembly according to claim 4 wherein the indicator means is mounted on the handle.

6. The assembly according to claim 5 wherein the length of the handle is adjustable.

7. The assembly according to claim I wherein a temperature sensor is electrically coupled to the induction coil to provide compensation for distortions of the electrical indication of variation of load caused by temperature increases.

8. The assembly according to claim I wherein the induction coil is coupled to a microprocessor that stores the electrical signals produced by the sensor.

9. The assembly according to claim 8 wherein the microprocessor includes means to download stored information to a printer.

10. A method of measuring and recording variations in the loads on rock bolts comprising placing spring washers between a rock plate and the nut of each rock bolt, apply a hand-held rock bolt load sensor according to claim 9 over each rock bolt, and computing the reading taken by the sensor on each rock bolt.

11. A hand-held rock bolt lead sensor comprising an annular sensor head pivotally mounted adjacent one end of an elongate handle, the sensor head comprising an induction coil and location means, the induction coil being electrically coupled to indicator means whereby in use the sensor head can be positioned over a rock bolt with the location means determining the position of the coil relative to the bolt and whereby the induction coil provides an electrical signal in dependence on variation in load on the bolt which is displayed by the indicator means.

* * * * *